United States Patent [19]
Bechtold et al.

[11] Patent Number: 5,136,301
[45] Date of Patent: Aug. 4, 1992

[54] PRIMARY FLIGHT DISPLAY SYSTEM HAVING A VERTICAL LINEAR ALTIMETER

[75] Inventors: Alan R. Bechtold; Charles A. Fenwick, both of Cedar Rapids; Charles E. Hall, Marion; Jeffrey R. VanPraag, Cedar Rapids, all of Iowa

[73] Assignee: Rockwell International Corporation, Seal Beach, Calif.

[21] Appl. No.: 400,611

[22] Filed: Aug. 30, 1989

[51] Int. Cl.⁵ .................... G01S 7/04; G01C 21/20
[52] U.S. Cl. .................... 342/176; 342/121; 340/977
[58] Field of Search .............. 342/462, 176, 177, 182, 342/121; 340/903, 904, 977, 973, 974, 975, 976, 978, 979

[56] References Cited

U.S. PATENT DOCUMENTS

| | | | |
|---|---|---|---|
| 3,184,731 | 5/1985 | Brown | 340/315 |
| 3,355,733 | 11/1967 | Mitchell et al. | 342/33 |
| 3,440,651 | 4/1969 | Fluhr et al. | 342/45 |
| 3,478,310 | 11/1969 | Cone, Jr. | 340/977 |
| 3,537,086 | 10/1970 | Andresen, Jr. | 340/977 X |
| 3,643,258 | 2/1972 | Balding | 342/413 |
| 3,705,306 | 12/1972 | Lydon et al. | 342/462 X |
| 3,737,885 | 6/1973 | Hedrick | 340/977 X |
| 3,737,902 | 6/1973 | O'Hagan et al. | 342/41 |
| 3,750,166 | 9/1973 | Dearth | 342/30 |
| 3,874,587 | 4/1975 | McGann et al. | 235/131 R |
| 3,889,104 | 6/1975 | Smith | 364/461 |
| 3,890,614 | 6/1975 | Argentieri et al. | 342/177 |
| 3,896,432 | 7/1975 | Young | 342/33 |
| 3,936,797 | 2/1976 | Andresen, Jr. | 340/977 |
| 3,999,007 | 12/1976 | Crane | 342/33 X |
| 4,249,175 | 2/1981 | Belrose et al. | 342/182 |
| 4,387,374 | 6/1983 | Wiener | 342/183 |
| 4,581,612 | 4/1986 | Jones | 342/120 X |
| 4,656,467 | 4/1987 | Strolle | 342/185 |
| 4,706,090 | 11/1987 | Hashiguchi et al. | 342/41 |

*Primary Examiner*—John B. Sotomayor
*Attorney, Agent, or Firm*—Gregory G. Williams; M. Lee Murrah; H. Frederick Hamann

[57] ABSTRACT

A primary flight display having a vertically oriented linear scale format altimeter therein which includes a non-numbered coarse tape-like image area, for displaying markings relating to altitude and a fine scale tape-like image area juxtaposed with said coarse tape-like image area said fine scale image area for displaying numerals in vertical translational movement and a central current altimeter reading with at least part of the reading disposed about said coarse scale image area.

23 Claims, 2 Drawing Sheets

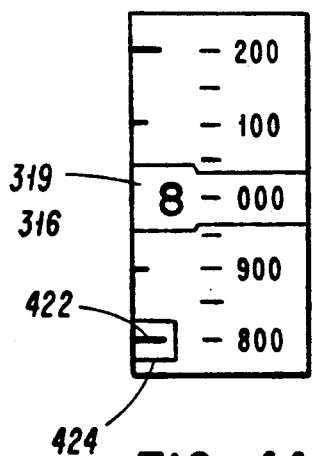 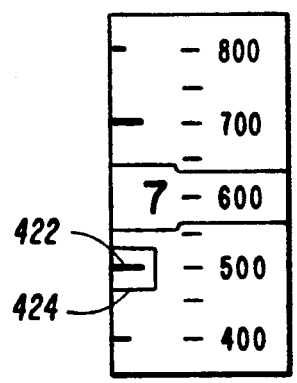 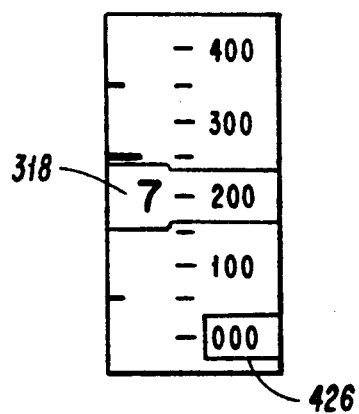
FIG 4A  FIG 4B  FIG 4C
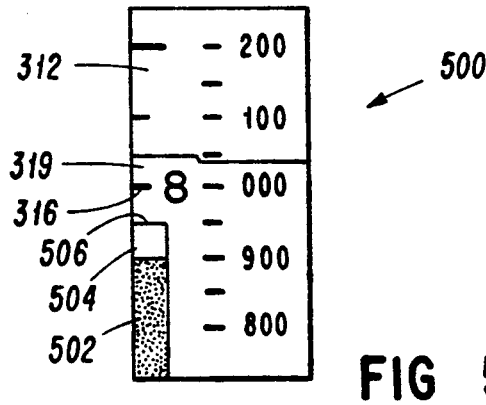
FIG 5
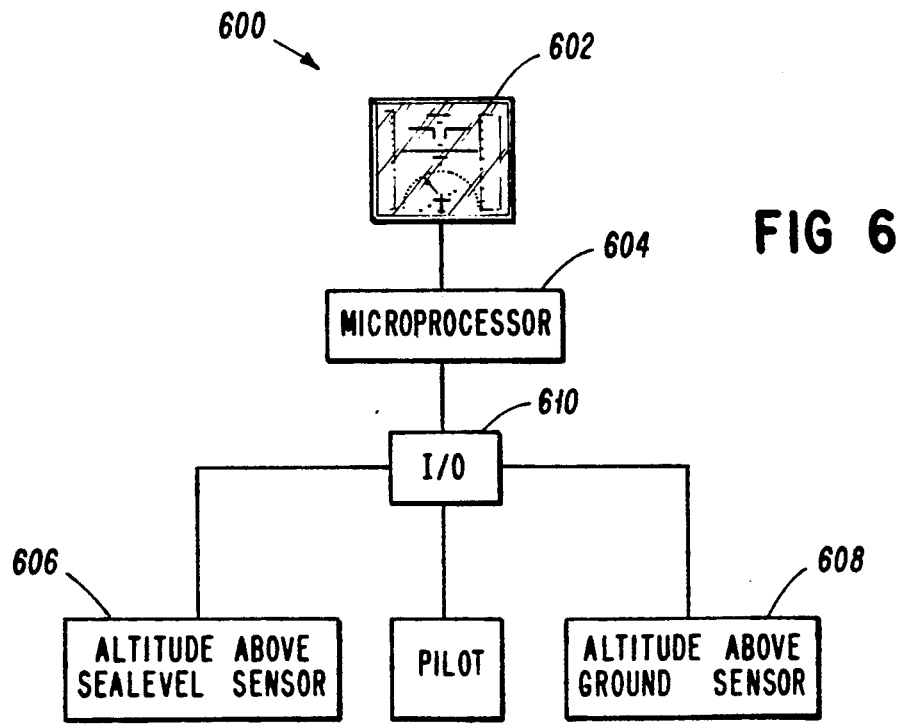
FIG 6

PRIMARY FLIGHT DISPLAY SYSTEM HAVING A VERTICAL LINEAR ALTIMETER

FIELD OF THE INVENTION

The present invention relates to Primary Flight Displays (PFDs), and more particularly, relates to PFDs having vertically oriented linear scale format altimeters therein, and even more particularly, concerns PFDs having such linear scale altimeters which display a range of altitudes in tens of thousands of feet while providing readability to a resolution of only a few feet.

BACKGROUND OF THE INVENTION

In the past, avionics display engineers have attempted to enhance the display of information to pilots and still retain many of the basic configurations and appearances of earlier displays. Much effort has been expended in this pursuit. However, frequently the "improvements", which are designed to enhance the pilot's efficiencies, are more confusing, less attractive and more difficult to master than the displays which they are purported to improve. One particular area that has been proven to be especially difficult is the use of PFDs having vertically oriented linear altimeters therein. The vertical scale linear altimeter design is attractive, as a general concept, because it allows for easy orientation of the primary flight instruments on a single display device, while preserving the classic T-shaped configuration of the airspeed indicator, attitude indicator, course indicator, and altimeter combination.

One attempt, as is shown in FIG. 1, has been to utilize two moving numbered tapes, where one tape represents a fine scale, while the other tape provides a coarse scale. This approach has several serious drawbacks; with a predominant problem being the increased likelihood of pilot confusion caused by the presence of several four or five digit numerals displayed at the same time, only one of which is relevant.

Another PFD, as is shown in FIG. 2, has been proposed where a single coarse tape is used together with a fine scale having a rotating disk for least significant digits, but it also, has undesirable features. Most importantly, both the fine scale and the coarse scale have a relatively small range of display altitudes. Typically, a coarse scale of limited range makes level-offs from climbs and descents more difficult. Similarly, a fine scale with a small range of altitudes often makes it difficult for the pilot to hold altitude without constantly looking directly at the display symbology.

Consequently, there exists a need for further improvement in PFDs which facilitate the display of important information to the pilot with no concomitant increase in pilot confusion caused by flight instrument complexities.

SUMMARY OF THE INVENTION

It is an object of the present invention to provide a PFD having a vertical linear scale altimeter therein which reduces the confusion often involved with vertical linear scale altimeters.

It is the feature of the present invention to include a non-numbered, moving tape-like image area for display of coarse altitude values, which provides absolute altitude information.

It is an advantage of the present invention to reduce the confusion by eliminating all altitude numerals in a coarse altitude scale which do not show the current altitude.

It is another object of the present invention to provide a PFD having a vertical linear scale altimeter which allows a pilot to easily detect the occurrence of a change in altitude.

It is another feature of the present invention to include a moving fine scale vertical linear tape-like image area which shows only the three least significant digits of the altimeter reading.

It is another advantage of the present invention to not require the pilot to look directly at the altitude area of the PFD in order to detect the occurrence of changes in altitude.

It is yet another object of the present invention to provide an altitude reading which is displayed at a fixed central point.

It is yet another feature of the present invention to position, about the coarse scale, altitude digits which are more significant than the three least significant digits of the fine scale.

It is yet another advantage of the present invention to provide current altitude information in a manner that is readily perceivable by the pilot.

It is still another object of the present invention to provide visual cues to the pilot for desired altitudes.

It is still another feature of the present invention to include preselect altitude bugs on both the coarse and fine scales at preselected altitudes.

It is still another advantage of the present invention to assist the pilot in level-offs by displaying the desired preselected altitude bugs over a wide range of possible altitudes.

It is a further object of the present invention to provide decision height information to the pilot.

It is a further feature of the present invention to include a ground reference bar, having a decision height reference bar thereon which represents the approaching ground and decision height.

It is a further advantage of the present invention to graphically display decision height information to the pilot in a logical and appealing manner.

The present invention provides a PFD having a vertical linear scale altimeter therein, which was designed to satisfy the aforementioned needs, provide the above described objects, include the previously discussed features, and achieve the earlier addressed advantages.

The present invention is carried out in a "confusion-less" design in the sense that the confusion which arises from the display of several numerals, each having in excess of three significant digits, is reduced by eliminating all such numerals having in excess of three significant digits, except for the current altitude reading, which is displayed at a fixed central point. Furthermore, when the aircraft has descended to a point where coarse altitude information is less important, the pilot is provided with much needed decision height information, instead of the coarse altitude scale.

Accordingly, the present invention includes a vertical linear scale altimeter which includes a non-numbered moving coarse tape-like image area together with a numbered moving fine tape-like image area and at least part of an actual altitude reading disposed, at a fixed central point in relation to the coarse tape-like image area. The invention further includes a ground reference bar having a decision height reference bar thereon for graphically displaying decision height information.

BRIEF DESCRIPTION OF THE DRAWINGS

The invention will be best understood by a reading of the description in conjunction with the drawings, in which:

FIGS. 4A, 4B, and 4C are representations of the vertical linear scale altimeter of the present invention, with preselect altitude bugs thereon, for desired altitudes, shown at various levels of aircraft altitude.

FIG. 5 is a representation of the vertical scale altimeter of the present invention which shows the ground reference bar having an additional decision height reference bar thereon.

FIG. 6 is a block diagram representation of a PFD system of the present invention.

DETAILED DESCRIPTION

Figure 1:
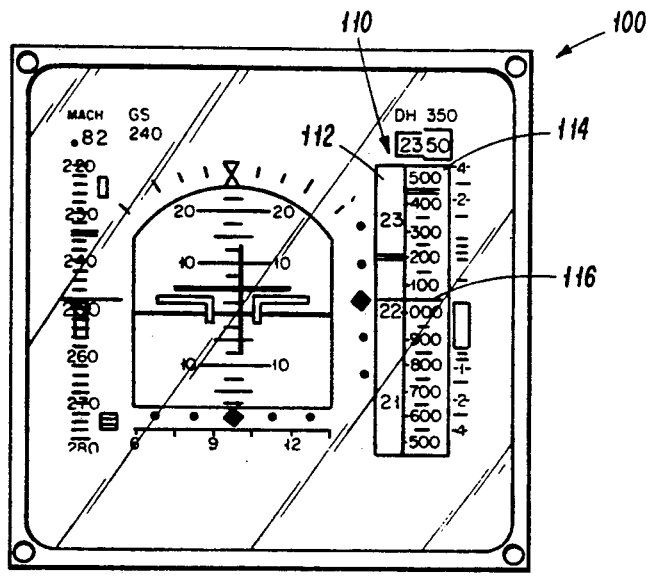
FIG. 1 is a representation of a prior art PFD having a numbered coarse scale and a numbered fine scale.

Now referring to the drawings where like reference numerals refer to like matter throughout.

Now referring to FIG. 1, there is shown a PFD, of the prior art, generally designated 100, having a vertical scale linear altimeter generally designated 110 therein. Altimeter 110 is shown having a coarse scale 112 juxtaposed with a fine scale 114. Coarse scale 112 is shown having digits thereon representing altitude values in excess of the least three significant digits. Fine scale 114 is shown having digits thereon for the three least significant digits of the altitude reading. A center reference index 116 is shown and is used as the reference for displaying the current altitude. The altimeter 110 is currently displaying an altitude of approximately 22,050. The numeral below the central mark 116 of 21,650 is irrelevant, likewise the numeral above the center reference level 116 of 23,350 is also irrelevant.

Figure 2:
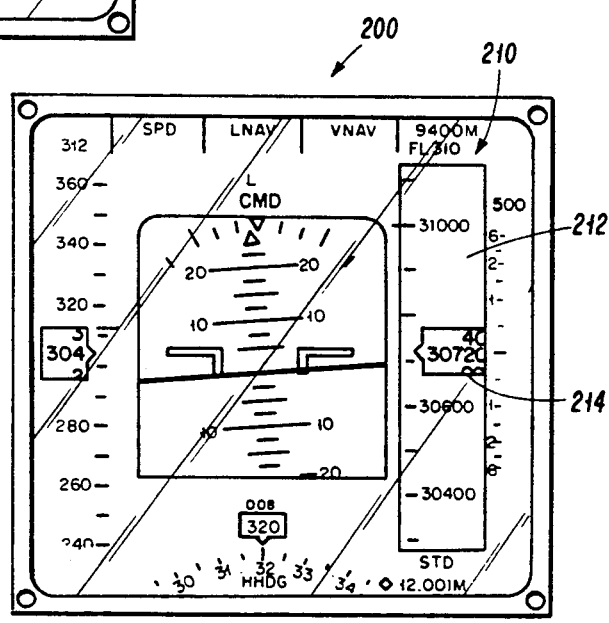
FIG. 2 is a representation of a prior art PFD which shows a numbered coarse scale and a rotating disk-like fine scale.

Now referring to FIG. 2, there is shown another PFD, of the prior art, which is generally designated 200 having a vertical scale altimeter 210 therein. Altimeter 210 includes a coarse tape-like display area 212 and a fine display area 214. The coarse tape-like display area 212 is shown having several five digit numerals thereon. The fine scale display area 214 is shown having a rotating disk-like arrangement for manipulating the two least significant digits of the altitude reading.

Figure 3:
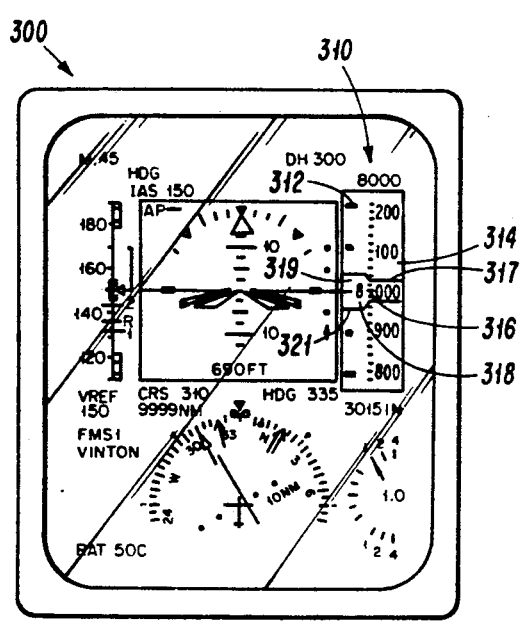
FIG. 3 is a schematic representation of a preferred embodiment of the PFD of the present invention which shows a non-numbered coarse scale Juxtaposed with a numbered fine scale, and additional digits, in excess of the three least significant digits, disposed at a fixed central location.

Now referring to FIG. 3, there is shown a PFD, of the present invention, which is generally designated 300, which includes a vertical scale altimeter 310 having a coarse altitude tape-like image area 312, juxtaposed with a fine scale tape-like image area 314, together with a fixed central current altitude index 316. A multi-digit numeral 318, with its most significant digit being superimposed over the coarse tape-like image area 312, and its three least significant digits being provided by the fine scale tape-like image area 314.

In operation, the altimeter 310 displays the current altitude to the pilot by displaying a multi-digit numberal 318 in a numeral region 319 at the fixed central index 316. The multi-digit numeral 318 consists of at least one digit which is more significant than the three significant digits of the fine scale 314. The numeral region 319 is bounded by upper line 317 and lower line 321. The more significant digits in numeral region 319 are superimposed over the moving coarse tape-like image area, while the three least significant digits are provided by the fine scale 314. Both the coarse scale 312 and the fine scale 314 are capable of translational motion in response to a change in the aircraft's altitude. The coarse scale 312 is marked by several non-numbered ruled markings thereon.

The multi-digit numeral 318, located in numeral region 319, is described above as being superimposed over the moving coarse tape-like image area. While this approach may be a preferred embodiment, it is contemplated and expected that the multi-digit numeral 318 and numeral region 319 may be disposed in other suitable configurations relative to the moving coarse tape-like image area. The multi-digit numeral 318 may be presented to the pilot in different fashions, including a scrolling digit-type display, similar to an automotive odometer, or any other suitable representation.

Ruled marking 320, which is of a smaller size in comparison with ruled marking 322, is used to indicate a 500 ft. altitude, while the larger ruled marking 322, indicates a 1,000 ft. altitude. Both ruled markings, 320, 322 provide altitude change information without creating extra confusion by adding several confusing and distracting numerals.

While the vertical scale linear altimeter, of the present is extremely advantageous when used in a PFD, it is certainly understood and contemplated that the vertical scale altimeter, of the present invention, could be used as a stand alone instrument or in combination with other flight instruments.

A more detailed understanding of the operation of the present invention can be achieved by referring to FIGS. 4A, 4B and 4C, which show the altimeter of the present invention, with the separate drawings depicting the configuration of the altimeter at different altitudes.

Now referring to FIG. 4A, there is shown an altimeter of the present invention, as generally shown in FIG. 3, with a preselect altitude bug 424 added over the lowest ruled marking 422, which is a larger or a 1,000 ft. marking. Consequently, the preselect altitude bug 424 is displayed to show a target altitude of 7,000 ft. Also shown in the numeral region 319, at a point below the center index 316, but above the lower line 321, is a representation of a portion of a "7" digit which is being scrolled upwardly as the aircraft descends below 8,000 ft.

Now referring to FIG. 4B, there is shown a configuration of an altimeter of the present invention, which shows the current altitude at 7,600 ft. (i.e., the aircraft has lost altitude). The preselect altitude bug 424, which is still about ruled marking 422, has been displaced upwardly and closer to the center of the altimeter.

Now referring to FIG. 4C, there is shown an altimeter of the present invention with a preselect altitude bug 426 in the fine scale tape-like image area 314 (FIG. 3). Preselect altitude bugs 424 and 426 are shown as circles, but other marks, such as, a pair of bars centered about the marking 422 and digits of the fine scale 314 also are contemplated. The preselect altitude bug 424 which was disposed around ruled marking 422 has been largely removed from view by the superposition of numeral 319 over the coarse scale 312. However, the preselect altitude bug 426 has now region appeared toward the bottom of fine scale 314 to provide the pilot with a target altitude, having greater scale sensitivity, promoting more precise acquisition of the target altitude.

Now referring to FIG. 5, there is shown another preferred embodiment of the altimeter of the present invention, generally designated 500, wherein the non-numbered moving coarse tape 312 is removed from view, at points below the numeral region 319. This display alteration occurs as the aircraft approaches a predetermined radio altitude, or actual height above the ground, and a rising ground reference bar 502 is shown. As the plane descends, the ground reference bar 502 progresses vertically upward toward the numeral region 319. When the aircraft has landed, the ground reference bar 502 will extend to the fixed central index 316. Also shown is a decision height reference bar 504, disposed above the ground reference bar 502, which represents the height above the ground at which the pilot must make critical landing decisions. When the top edge 506 of decision height reference bar 504 reaches the fixed central index 316, the pilot has reached the predetermined decision height. The dimensions of decision height reference bar 504, in terms of feet above the ground, is a function of several factors including the type and configuration of the aircraft and is set by the pilot.

The above description of the present invention, as shown in FIGS. 3, 4A, 4B, 4C and 5, describes a coarse altitude tape-like image area 312 and a fine scale tape-like image area 314 with a multi-digit numeral 318 superimposed over the coarse tape-like image area 312. This configuration could be carried out in a mechanical design where the coarse tape-like image area 312 and the fine scale tape-like image area 314 are mechanical tapes capable of translational motion and the multi-digit numeral 318 is a rotating drum or disk disposed over the coarse tape 312. Also, the present invention could be practiced by emulating such a display on any video display device including a CRT, LCD, TFEL or a plasma display.

Now referring to FIG. 6, there is shown a primary flight display system, of the present invention, generally designated 600 which includes a display device 602. Display device 602 is preferably a CRT or LCD. Coupled with display 602 is a microprocessor 604 which receives input from altitude above sea level sensor 606 and altitude above ground sensor 608, by way of the input/output device 610. Microprocessor 604 outputs a signal to control display 602. Altitude above sea level sensor 606 may be a barometric altitude sensor, which is well know in the art, a GPS receiver, or any other suitable device for measuring the altitude above sea level. Altitude above ground sensor 608 may be a radio altimeter, which are well known in the art, or other suitable devices for measuring the altitude above the ground. Input/output device 610 is coupled with microprocessor 604 for providing information from the altitude sensors 606,608 and the pilot and crew to the microprocessor 604 which is necessary to affect the overall operation of the system 600.

It is thought that the altimeter of the present invention, and many of its advantages, will be understood for the foregoing description. It will be apparent that various changes can be made in the form, construction and arrangement of the parts and steps thereof, without departing from the spirit and scope of in the invention or sacrificing all their material advantages, the form herein before described being merely preferred or exemplary embodiments thereof.

We claim:

1. An electronic vertical linear scale aircraft altimeter display device comprising:
    a frame having a top side, a bottom side, a right side and a left side;
    said top side and said bottom side disposed in a parallel configuration;
    said right side and said left side disposed in a parallel configuration and separating said top side and said bottom side;
    a fixed horizontal index reference bar, disposed parallel with said top side and said bottom side, for providing a fixed reference line;
    a first display area, disposed adjacent to said fixed horizontal index reference bar, for providing a plurality of least significant digits, of a multi-digit numeral, said plurality of least significant digits arranged in a predetermined fashion in a first moving linear array;
    a second display area, disposed adjacent said first display area, for providing a plurality of reference marks arranged in a second moving linear array; and,
    a third display area, disposed adjacent said first display area, for providing at least a single more significant digit, of said multi-digit numeral, which is next more significant than said least significant digits.

2. A device of claim 1 wherein said first moving linear array of said plurality of least significant digits is organized in ten groups of, equally spaced apart, three digit numerals, with the two least significant digits, in each group, being zeros and the most significant digit increasing in numerical order from zero to nine.

3. A device of claim 2 wherein said plurality of reference marks are horizontal linear marks, spaced apart at a predetermined equal distance.

4. A device of claim 3 wherein said third display area is disposed adjacent to said first display area and at a point horizontal with said fixed horizontal index reference bar.

5. A device of claim 1 wherein said second display area further providing a ground reference bar, extending from said bottom side toward said top side and further disposed over said plurality of reference marks, so that, said reference marks are occluded by said ground reference bar.

6. A device of claim 5 wherein said second display area further providing a decision height reference bar positioned above said ground reference bar for providing decision height information.

7. A device of claim 6 wherein more significant digit of said third display area, is a digit which scrolls vertically within said third display area.

8. Apparatus as defined in claim 1 wherein said reference marks are all non-numbered.

9. A primary flight display system comprising:
    means for sensing altitude above sea level and generating an altitude above sea level signal;
    means for sensing the altitude above the ground and generating an altitude above the ground signal;
    a display means having a frame having a top side, a bottom side, a right side and a left side;
    said top side and said bottom side disposed in a parallel configuration;

said right side and said left side disposed in a parallel configuration and separating said top side and said bottom side;

a fixed horizontal index reference bar, disposed parallel with said top side and said bottom side, for providing a fixed reference line;

a first display area, disposed adjacent to said fixed horizontal index reference bar, for providing a plurality of least significant digits, of a multi-digit numeral, said plurality of least significant digits arranged in a predetermined fashion in a first moving linear array;

a second display area, disposed adjacent said first display area, for providing a plurality of reference marks arranged in a second moving linear array;

a third display area, disposed adjacent said first display area, for providing at least a single more significant digit, of said multi-digit numeral, which is next more significant than said least significant digits; and, means for manipulating said first display area, said second display area, and said third display area in response to said altitude above sea level signal.

10. A system of claim 9 wherein said means for sensing altitude above sea level is a barometric altimeter.

11. A system of claim 10 wherein said means for sensing altitude above the ground comprises a radio altimeter.

12. A system of claim 11 wherein said display means further comprises a liquid crystal display.

13. A system of claim 11 wherein said display means further comprises a cathode ray tube.

14. A system of claim 13 wherein said means for manipulating further comprises a microprocessor.

15. A system of claim 14 wherein said second display area further providing a ground reference bar, extending from said bottom side toward said top side and further disposed over said plurality of reference marks, so that, said reference marks are occluded by said ground reference bar.

16. A system of claim 15 wherein said second display area further providing a decision height reference bar positioned above said ground reference bar for providing decision height information.

17. A system of claim 16 wherein said third display area is disposed adjacent to said first display area and at a point horizontal with said fixed horizontal index reference bar.

18. A system of claim 17 wherein said plurality of reference marks are horizontal linear marks, spaced apart at a predetermined equal distance.

19. A primary flight display system comprising:
a barometric altimeter;
a radio altimeter;
a liquid crystal display device having a frame having a top side, a bottom side, a right side and a left side;
said top side and said bottom side disposed in a parallel configuration;
said right side and said left side disposed in a parallel configuration and separating said top side and said bottom side;

a fixed horizontal index reference bar, disposed parallel with said top side and said bottom side, for providing a fixed reference point;

a first display area, disposed adjacent to said fixed horizontal index reference bar, for providing a plurality of least significant digits, of a multi-digit numeral, said plurality of least significant digits arranged in a predetermined fashion in a first moving linear array;

a second display area, disposed adjacent said first display area, for providing a plurality of reference marks arranged in a second moving linear array;

a third display area, disposed adjacent said first display area, for providing at least a single more significant digit, of said multi-digit numeral, which is next more significant than said least significant digits; and, a microprocessor, coupled with said radio altimeter, said barometric altimeter and said liquid crystal display, for manipulating said first display area, said second display area, and said third display area of said liquid crystal display in response to said altitude above sea level signal.

20. A device of claim 19 wherein said second display area further providing a ground reference bar, extending from said bottom side toward said top side and further disposed over said plurality of reference marks, so that, said reference marks are occluded by said ground reference bar.

21. A device of claim 20 wherein said second display area further providing a decision height reference bar positioned above said ground reference bar for providing decision height information.

22. A display of altitude data formulated for use by an aircraft pilot in which a single, complete altitude figure is presented along with sliding scales of fine altitude figures, and coarse altitude marks, said display generated by:

constructing an image including coarse altitude marks, all non-numbered, vertically spaced apart and referenced to a central position on a selected part of a video screen;

constructing an image including fine altitude figures spaced apart and referenced to a central position on a selected part of a video screen along side said part used for said altitude marks; and, constructing an image including an exact altitude figure only at said central position on said video screen.

23. An improved primary flight display of the type having a vertical linear altimeter therein, the improvement comprising:

a non-numbered coarse altitude image area, for displaying a series of ruled altitude markings which are capable of vertical translational motion;

a numbered fine scale image area, juxtaposed with said non-numbered coarse image area, said fine scale image area for displaying numerals in vertical translational movement; and, a current altitude figure disposed at a fixed central index and further disposed over said coarse altitude image area.

* * * * *